United States Patent

Yamaguchi et al.

[11] Patent Number: 5,774,629
[45] Date of Patent: Jun. 30, 1998

[54] INFERENCE APPARATUS USING OCCURENCE RATE DATA AND DEGREE OF RELEVANCE DATA

[75] Inventors: Hiroyoshi Yamaguchi; Tatsuya Kitamura; Kunitoshi Suzuki, all of Hiratsuka, Japan

[73] Assignee: Komatsu Ltd., Tokyo, Japan

[21] Appl. No.: 564,244

[22] PCT Filed: Jul. 5, 1994

[86] PCT No.: PCT/JP94/01091

§ 371 Date: Dec. 20, 1995

§ 102(e) Date: Dec. 20, 1995

[87] PCT Pub. No.: WO95/02216

PCT Pub. Date: Jan. 19, 1995

[30] Foreign Application Priority Data

Jul. 5, 1993 [JP] Japan .................................. 5-165652
Jul. 5, 1993 [JP] Japan .................................. 5-165653

[51] Int. Cl.[6] ................................................ G06F 15/18
[52] U.S. Cl. ................................ 395/10; 395/60; 395/61
[58] Field of Search ............................ 395/3, 60, 61, 395/68, 50–51, 10–12; 364/571.04

[56] References Cited

FOREIGN PATENT DOCUMENTS

| 01026299A | 1/1989 | Japan | G08B 23/00 |
| 64-26299 | 1/1989 | Japan | G08B 23/00 |
| 03030024A | 2/1991 | Japan | G06F 9/44 |
| 3-30024 | 2/1991 | Japan | G06F 9/44 |
| 03263227A | 11/1991 | Japan | G06F 9/44 |
| 3-263227 | 11/1991 | Japan | G06F 9/44 |

OTHER PUBLICATIONS

International Search Report for International Application No. PCT/JP94/01091, mailed Oct. 4, 1994.

*Primary Examiner*—Tariq R. Hafiz
*Attorney, Agent, or Firm*—Varndell Legal Group

[57] ABSTRACT

An apparatus for correctly inferring the causes of a failure of driving machine or the like. Each time a true cause is found, the data on the degree of relevance of the cause is so corrected that the degree of the other causes becomes high and those of the other causes become low. On the basis of the data on the failure rate and the data on the degree of the relevance, the certainty of each cause is inferred by a first inferring means. The data on the predicted failure rate of each cause and the data on the actual failure rate are compared, and the certainty of each cause is inferred by a second inferring means in such a way that the certainty of a cause having less errors becomes higher. The certainties inferred by the first and second inferring means are weighted in a predetermined way. Based upon these weighted certainties, final certainties are inferred.

7 Claims, 8 Drawing Sheets

| INPUT DATA | | | | | SYSTEM OUTPUT | | | | |
|---|---|---|---|---|---|---|---|---|---|
| PHENOMENON 1 | PHENOMENON 2 | ... | PHENOMENON i | PHENOMENON m | CAUSE 1 | CAUSE 2 | ... | CAUSE j | CAUSE n |
| 0.8 | 0.5 | | 0.7 | 0 | 0.1 | 0 | | 0.6 | 0.3 |

| INPUT DATA | | | | | DISPLAY DATA | | | | |
|---|---|---|---|---|---|---|---|---|---|
| PHENOMENON 1 | PHENOMENON 2 | ... | PHENOMENON i | PHENOMENON m | CAUSE 1 | CAUSE 2 | ... | CAUSE t | CAUSE n |
| 0.8 | 0.5 | | 0.7 | 0 | 0 | 0 | | 1 | 0 |

| NORMAL DIAGNOSIS KNOWLEDGE (NORMAL DIAGNOSIS MATRIX) | | | |
|---|---|---|---|
| CAUSE / PHENOMENON | CAUSE 1 | CAUSE 2 | CAUSE 3 |
| PHENOMENON 1 | | | |
| PHENOMENON 2 | | ← | |
| PHENOMENON 3 | | | |

FIG.7(a)

| REVERSE DIAGNOSIS KNOWLEDGE (REVERSE DIAGNOSIS MATRIX) | | | |
|---|---|---|---|
| CAUSE / PHENOMENON | CAUSE 1 | CAUSE 2 | CAUSE 3 |
| PHENOMENON 1 | | | |
| PHENOMENON 2 | | ↓ | |
| PHENOMENON 3 | | | |

FIG.7(b)

| PHENOMENON / CAUSE | BLACK EXHAUST COLORING | NO POWER | GRADUALLY WORSENING |
|---|---|---|---|
| AIR CLEANER CLOGGING | A | C | C |
| INJECTION NOZZLE MALFUNCTION | C | A | C |
| BATTERY MALFUNCTION | - | - | B |

FIG.8

| PHENOMENON / CAUSE | BLACK EXHAUST COLORING | NO POWER | GRADUALLY WORSENING |
|---|---|---|---|
| AIR CLEANER CLOGGING | b | c | c |
| INJECTION NOZZLE MALFUNCTION | a | b | - |
| BATTERY MALFUNCTION | o | - | b |

FIG.9

| No | PHENOMENON | | | CAUSE | DIAGNOSIS RESULTS (DEGREE OF CERTAINTY) | | |
|---|---|---|---|---|---|---|---|
| | BLACK EXHAUST COLORING | NO POWER | GRADUALLY WORSENING | | NORMAL DIAGNOSIS | REVERSE DIAGNOSIS | NORMAL AND REVERSE DIAGNOSIS |
| 1 | a | b | c | AIR CLEANER CLOGGING | 88% | 66% | 77% |
| | | | | INJECTION NOZZLE MALFUNCTION | 73% | 90% | 82% |
| | | | | BATTERY MALFUNCTION | 15% | 30% | 23% |
| 2 | b | b | b | AIR CLEANER CLOGGING | 70% | 70% | 70% |
| | | | | INJECTION NOZZLE MALFUNCTION | 70% | 50% | 60% |
| | | | | BATTERY MALFUNCTION | 25% | 75% | 50% |
| 3 | c | - | c | AIR CLEANER CLOGGING | 33% | 30% | 32% |
| | | | | INJECTION NOZZLE MALFUNCTION | 18% | 30% | 24% |
| | | | | BATTERY MALFUNCTION | 15% | 30% | 23% |

EXTENT OF OCCURRENCE (a:LARGE b:MEDIUM c:SMALL o:NO OCCURRENCE)

FIG. 10

INFERENCE APPARATUS USING OCCURENCE RATE DATA AND DEGREE OF RELEVANCE DATA

TECHNICAL FIELD

The present invention relates to an inference apparatus for inferring the causes of a failure of a drive machine or the like based on the results of so-called normal diagnosis or reverse diagnosis.

BACKGROUND ART

The inference of the cause of failure, etc., of a drive machine in construction machinery or the like by means of so-called normal diagnosis has been common practice for some time.

A normal diagnosis treatment involves inferring the causes of a failure from the causal relationship between various phenomena and various causes, that is, from the current incidence of various phenomena and normal diagnosis knowledge indicating the degree of effect, incidence, etc., between a phenomenon and a cause. This normal diagnosis tends to infer at a higher degree of certainty the higher is the incidence of the cause.

Normal diagnosis is performed by the means (a) and (b) shown below, for example.

(a) This is based on Bayesian theory. When a great deal of past diagnostic data are available, these data are analyzed and the occurrence probability of the cause with respect to the occurring phenomenon (the conditional probability) is calculated from the following formula (1).

$$F(Cj|Pi) = \{F(Pi|Cj) \cdot F(Cj)\} / \{\Sigma F(Pi|Cn) \cdot F(Cn)\} \quad (1)$$

Here, $F(Cj|Pi)$ is the conditional probability of cause $Cj$ at the time of occurrence of phenomenon $Pi$, $F(Pi|Cj)$ is the conditional probability of phenomenon $Pi$ at the time of occurrence of cause $Cj$, $F(Cj)$ is the occurrence probability of cause $Cj$, and $n$ is the number of causes.

The drawback to a method based on Bayesian theory is that although when numerous failure cause data are available the terms on the right side of the above-mentioned formula (1) are determined subjectively and the $F(Cj|Pi)$ on the left side can be determined effectively, in actual practice it is rare for numerous failure diagnosis data to be available, and this method cannot be applied when there are few data available. Also, this method involves computing the average occurrence probability for all data, and does not allow trends in causes that have occurred recently to be considered.

(b) Another method is to extract the occurrence probability of a cause with respect to the occurring phenomenon (the conditional probability) based on the past experience of experts, and to compile this in a matrix and use it as normal diagnosis knowledge to perform normal diagnosis. The advantage of this method is that it is easy to obtain knowledge because the knowledge is expressed in a matrix form, and system construction is easier.

Normal diagnosis knowledge can be expressed as in FIG. 2(a), for example. In the figure, Wij can be treated as corresponding to the conditional probability $F(Cj|Pi)$ in the Bayesian theory as indicated by the following formula (2).

$$Wij = F(Cj|Pi) \quad (2)$$

This normal diagnosis knowledge is based on the past experience of experts, the advantage of which is that knowledge can be easily extracted, without a need for a large quantity of failure data as in the case of the Bayesian theory in (a). This is considered to be the most salient advantage to an expert system.

However, since the knowledge of an expert is not obtained from the analysis of actual failure diagnosis data, the reliability thereof is not considered to be that high.

Also, incidents continue to occur even after system construction. At this point, an expert can learn this and modify his or her knowledge, but the system itself cannot update its information, so the knowledge becomes obsolete, and before long the system can no longer make the correct evaluation. This is considered to be the major drawback to an expert system.

If one were to attempt to construct a system that performs diagnosis based on continuously up-to-date information, then one would have to keep modifying the knowledge whenever needed, entailing a tremendous amount of labor and driving up the cost markedly.

Meanwhile, an error back propagation method (BP method) that utilizes a neural network is generally used for learning. This BP method is generally applied to problems of pattern recognition. For example, it is applied to classification problems for deciding upon an assignation category from the characteristics of the input pattern. Specifically, this BP method is a means that allows similar patterns to be recognized by preparing in advance a plurality of learning data in which input patterns and instruction output serve as the data, and then learning these data. However, a BP method does not allow incidence to be considered. Also, when there are numerous learning data, the patterns can sometimes be studied successfully, but there is no guarantee that the learning will be integrated. Naturally, successful learning is impossible when there are few learning data. Furthermore, the contents of the learning model are a black box, and is not known how to assign meaning to the learning results.

The first invention of the present invention was conceived in light of this situation, and an object thereof is to use continuously up-to-date data to re-learn normal diagnosis knowledge that takes incidence into account and thereby always perform inference accurately, and to allow this learning to be carried out easily and with good integration.

Another way to infer the cause of a failure involves reverse diagnosis treatment.

This involves inferring the failure cause by comparing the reverse diagnosis knowledge indicating the causal relationship between the various causes and the various phenomena (a standard occurrence pattern of the various phenomena predicted from the causes) with the occurrence pattern for the various phenomena actually encountered. This reverse diagnosis tends to infer at a higher degree of certainty the more similarity there is between the standard occurrence pattern and the actual occurrence pattern.

If the inference relies solely on the above-mentioned normal diagnosis treatment, then it will indeed be possible to effectively specify those causes with a high occurrence incidence, but since the occurrence pattern of the various phenomena is not considered as it is with reverse diagnosis treatment, there is the danger that an important cause with a low occurrence incidence will be overlooked, which can lead to errors in the inference results.

On the other hand, if the inference relies solely on the above-mentioned reverse diagnosis treatment, there will indeed be no overlooking of important causes since the occurrence pattern of the various phenomena is considered, but since the occurrence incidence of the failure causes is not considered as it is with the normal diagnosis treatment, there is the danger that causes which occur only rarely will be suspected, which can lead to errors in the inference results.

The second invention of the present invention was conceived in light of this situation, and an object thereof is to offer an inference apparatus with which inference results with few errors can be obtained by compensating for the drawbacks to the above-mentioned normal diagnosis treatment and reverse diagnosis treatment.

DISCLOSURE OF THE INVENTION

In view of this, the first invention of the present invention is an inference apparatus for inferring causes based on occurrence rate data that indicate the current rate of occurrence of various phenomena, and on degree of relevance data that indicate the degree of relevance between the various phenomena and the various causes, characterized in that;

each time a true cause is found, the degree of relevance data are corrected such that the degree of relevance between this cause and the various phenomena becomes higher and the degree of relevance between causes other than this cause and the various phenomena becomes lower.

With such a structure, the degree of relevance data are successively corrected such that each time a true cause is found, the degree of relevance between this cause and the various phenomena becomes higher and the degree of relevance between causes other than this cause and the various phenomena becomes lower. Thus, normal diagnosis knowledge that takes incidence into account is continuously re-learned based on new data, so the inference is always made accurately. Furthermore, this learning can be accomplished easily and with good integration.

The second invention of the present invention is an inference apparatus for inferring causes based on occurrence rate data that indicate a current rate of occurrence of various phenomena, and on degree of relevance data that indicate a degree of relevance between the various phenomena and the various causes, characterized by comprising:

first inference means for inferring a degree of certainty for each cause based on the occurrence rate data and the degree of relevance data, second inference means for comparing the predicted occurrence rate data and the occurrence rate data for each cause and inferring the degree of certainty for each cause such that the smaller is an error in the causes, the greater is the degree of certainty, and means for giving specific weighting to each degree of certainty inferred by the first and second inference means and finally inferring the degree of certainty for each cause based on these weighted degrees of certainty.

With such a structure, the degree of certainty for each cause is inferred by the first inference means based on the occurrence rate data and the degree of relevance data. The inference made by this first inference means takes the occurrence rate data into account, so there is a tendency for important causes with a low occurrence incidence to be overlooked.

Meanwhile, the predicted occurrence rate data are compared with the occurrence rate data for each cause, and the degree of certainty for each cause is inferred by the second inference means such that the degree of certainty increases the smaller is the error for the cause. The inference made by this second inference means is the product of comparing the two types of occurrence rate data, and does not take occurrence incidence into account, so there is a tendency for causes with a low occurrence incidence to be suspected.

In view of this, specific weighting is given to the degrees of certainty inferred by the first and second inference means, and the degree of certainty for each cause is finally inferred based on these weighted degrees of certainty. This final inference is such that the higher is the occurrence incidence, and the smaller is the error in the two types of occurrence rate data, the greater is the degree of certainty, so an accurate inference is made without the drawbacks encountered when an inference was made with the first or second inference means alone.

BRIEF DESCRIPTION OF THE DRAWINGS

FIGS. 7(a) and 7(b) conceptually illustrate the structure of normal diagnosis knowledge and reverse diagnosis information;

FIG. 8 is a specific example of normal diagnosis information;

FIG. 9 is a specific example of reverse diagnosis information; and

FIG. 10 shows the diagnosis results in the embodiment.

BEST MODE FOR CARRYING OUT THE INVENTION

Figure 11:
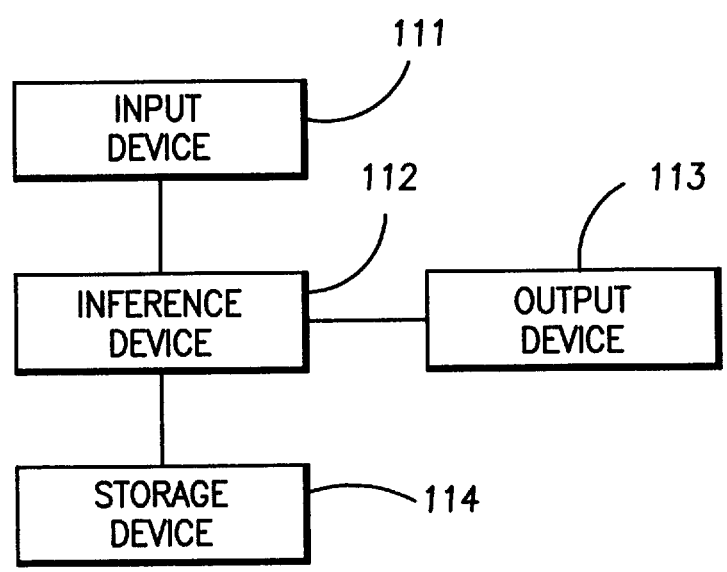
FIG. 11 shows an apparatus in accordance with the present invention.

Embodiments of the inference apparatus pertaining to the present invention will now be described through reference to the figures. FIG. 11 shows a basic apparatus according to the present invention including an input device 111, a storage device 114, an inference device 112, and an output device 113, which will be described in more detail later.

Figure 1:
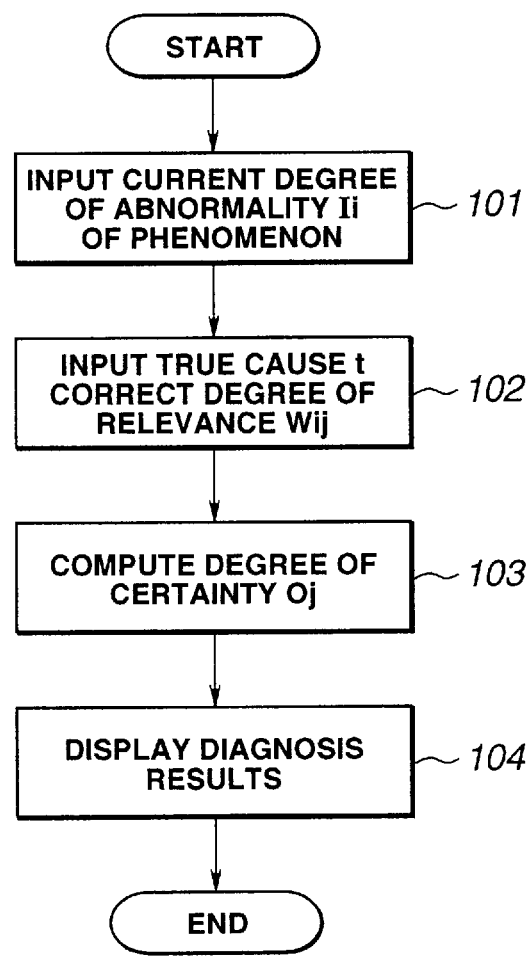
FIG. 1 is a flow chart illustrating the treatment procedure in an embodiment of the inference apparatus pertaining to the present invention.

In the embodiments, a failure diagnosis apparatus for a construction machine is assumed. In specific terms, failure diagnosis is performed in the inference device 112 for a construction machine according to the procedure shown in FIG. 1 or by a personal computer (hereinafter referred to as "PC").

Figures 2A, 2B:
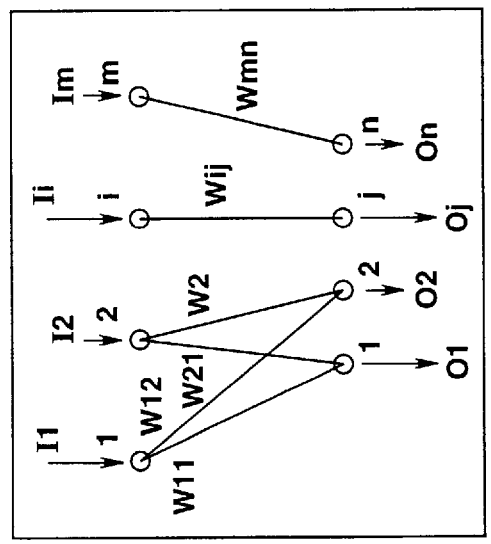
FIGS. 2(a) and 2(b) conceptually illustrate the structure of normal diagnosis information, and illustrate this structure as a learning model.

FIG. 2(a) shows the structure of the normal diagnosis knowledge used to perform the normal diagnosis treatment in the form of a matrix. FIG. 2(b) shows the normal diagnosis knowledge matrix in FIG. 2(a) converted into a learning model (neural network model).

As shown in the learning model in FIG. 2(b), various phenomena 1, 2, . . . i . . . m are allocated to input neurons 1, 2, . . . i . . . m, various causes 1, 2, . . . j . . . n are allocated to output neurons 1, 2, . . . j . . . n, and the various phenomena and causes (input and output neurons) are connected by weighting Wij that indicates the degree of causal relationship of these.

Here, the input Ii to the input neuron i is input as data indicating the current occurrence rate of the various phenomena 1, 2, . . . , that is, the degree of abnormality Ii, when the operator operates the keyboard of the PC, for example.

The degree of abnormality is within a range of $0 \leq Ii < 1$, and is given as a numerical value that is a subjective evaluation by the operator. In this case, a degree of abnormality of Ii=0 corresponds to an evaluation of "no abnormality whatsoever has occurred," while a degree of abnormality of Ii=1 corresponds to an evaluation of "a serious abnormality has occurred." When the abnormality is unknown (or not checked), a "-" that indicates data other than the above-mentioned numerical values is input. However, when "-" is given as the degree of abnormality Ii, it is treated as a degree of abnormality of Ii=0 for the purposes of the computation discussed below (step 101).

A normal diagnosis treatment is then executed based on the degree of abnormality Ii input above.

Normal diagnosis knowledge that indicates the causal relation between the various phenomena and the various causes (the degree of effect, occurrence incidence, etc., between phenomena and causes) is required for this normal diagnosis treatment. The data for this normal diagnosis knowledge are stored in a specific memory, such as storage device 114 in FIG.11, ahead of time, unlike the degree of abnormality Ii. Since the above-mentioned normal diagnosis knowledge is data that indicate the degree of relevance between the various phenomena and the various causes, it will hereinafter be referred to as the degree of relevance Wij. The degree of relevance Wij is a weight of the causal relation (incidence) between the input neuron i and the output neuron j in the above-mentioned learning model.

The degree of relevance Wij is given as a vague numerical value within the range of $0 \leq Wij \leq 1$, just as with the degree of abnormality Ii. In this case, a degree of relevance of Wij=0 corresponds to "no relevance whatsoever," while a degree of relevance of Wij=1 corresponds to "closely related." When the causal relation between the phenomenon i and the cause j is unknown, a "-" is used to express the fact that the value is outside the above-mentioned numerical value range of 0 to 1. However, when the degree of relevance Wij is "-," it is treated as a degree of relevance of Wij=0 for the purposes of the computation discussed below.

The degree of certainty Oj obtained by normal diagnosis based on the degree of abnormality Ii and the degree of relevance Wij as above is computed from the following formula (3).

$$Oj = \Sigma(Wij \cdot Ii) \qquad (3)$$

However, when the degree of certainty Oj is found by the above-mentioned computation to be less than 0, the degree of certainty Oj is corrected to 0, and when the degree of certainty Oj is greater than 1, the degree of certainty Oj is corrected to 1, so that the degree of certainty Oj is always within a range of 0 to 1.

The degree of certainty Oj may also be computed from the following formula (4) or (5) instead of the above-mentioned formula (3).

$$Oj = \max \{\min (Wij, Ii)\} \qquad (4)$$

$$Oj = \max (Wij \cdot Ii) \qquad (5)$$

In the above-mentioned learning model, the above-mentioned Oj refers to the output from the output neuron j obtained when Ii is input to the input neuron i.

Figures 3, 4, 5:
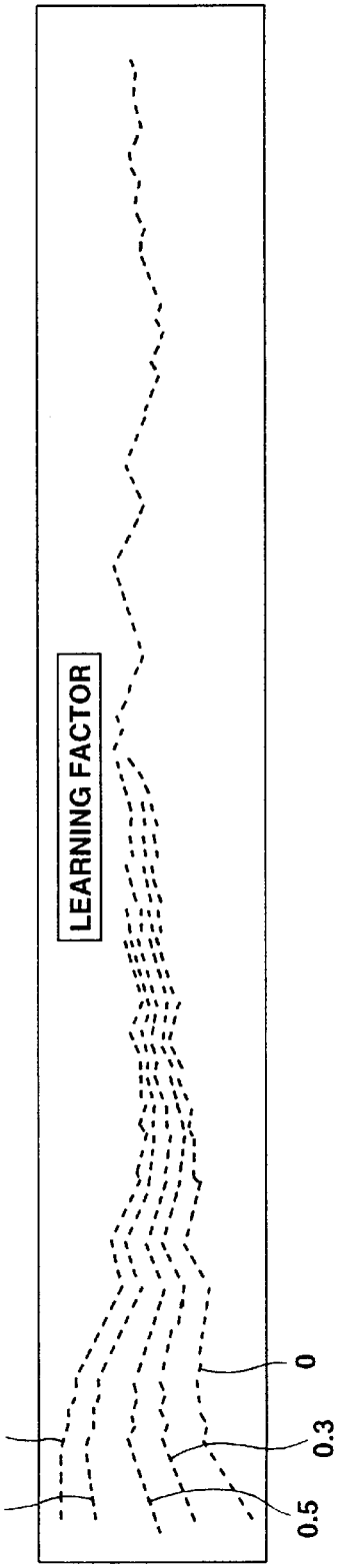
FIG. 3 is an example of the relation between input data and the output of the system.
FIG. 4 is an example of the relation between the input data in a common learning situation and the output of the system.
FIG. 5 is a graph of the simulated results in the embodiment.

FIG. 3 shows an example of the relation between the input data Ii and the output of the system Oj.

This system outputs the inferred cause j and the degree of certainty thereof (occurrence probability) with respect to given input data. Here, it is preferable for the output of causes that occur at a high incidence to be high, and for those that are possible to be inferred without being missed.

In particular, the output of failure causes that have occurred recently must be high.

In view of this, in this embodiment the incidence of the causes is learned and the degree of relevance Wij is corrected.

When the true cause thus determined is termed t, the instruction data Tj that are generally encountered are as follows.

$$Tj=1(j=t) \text{ or } 0 \text{ (othe than } j=t)$$

FIG. 4 is an example of the relation between the input data and the instruction data in this case. The significance of FIG. 4 is that the output of the cause t should be 1 and the output of the other causes should be 0 with respect to given input data. Indeed, there is no problem with interpreting this to mean that when a case in which the cause is the cause t occurs at a high incidence within a given period, the output of the cause t will approach 1. However, there is a problem with learning in which other causes are adjusted to 0 just because of a small number of failure data within a given period.

In view of this, in this embodiment, when the true cause t is determined, the degree of relevance Wij between this cause t and the various phenomena is increased, and the relevance between those causes other than this cause and the various phenomena is decreased proportionately to the amount of increase in the degree of relevance Wij.

Specifically, every time the true cause is determined to be t, the degree of relevance correction amount dWit is computed as follows using the method of steepest descent with the error E as the evaluation function.

$$dWit\mathrel{+}= -\eta \cdot \partial E/\partial Wit \qquad (6)$$

Here, the error E is expressed by $$E = (1-Ot)*2 \qquad (7)$$

and g is the learning factor. (X) *2 is defined as the square of X.

Thus, from the above-mentioned formulas (6) and (7) we obtain $$dwit\mathrel{+}= \eta \cdot (1-Ot) \cdot \partial Ot/\partial Wit \qquad (8)$$

Here, the $\partial To/\partial Ot$ on the right side will vary depending on which of the above-mentioned formulas (3) through (5) is used to compute the degree of certainty, but when the degree of certainty is computed by formula (3), for example, the above-mentioned formula (8) gives the following formula.

$$dwit\mathrel{+}= \eta \cdot (1-Ot) \cdot Ii \qquad (9)$$

Meanwhile, out of all the past failure diagnosis data, if we let the number of times the phenomenon i occurred be N, the number of times therein that the cause t was the true cause be n, and the number of times the cause j other than t was the true cause be n', then the degree of relevance correction amount dWit+ of the cause t is expressed by the following formula (10).

$$dWit+ = (n+1)/(N+1) - n/N \quad (10)$$
$$= (N-n)/(N+1)N$$
$$= (1-Wit)/(N+1)$$

The degree of relevance correction amount dWij– for the cause j (j other than t) is expressed by the following formula (11).

$$dWij- = n'/(N+1) - n'/N \quad (11)$$
$$= n'/(N+1)N$$
$$= Wij/(N+1)$$

Thus, if we delete N +1 from these formulas (10) and (11), the degree of relevance correction amount dWij– for the cause j is determined from the following relational formula that does not contain the number of times N, n, or n' for failure diagnosis data.

$$dWij-=\{-Wij/(1-Wit)\}\cdot dWit+ \quad (12)$$

The value obtained from the above-mentioned formula (8) should be substituted for dWit+ on the right side in the above-mentioned formula (12).

In this manner the degree of relevance Wit is corrected by the addition of the degree of relevance correction amount dWit+ for the cause t obtained as in the above-mentioned formula (8) to the degree of relevance Wit, and this corrected degree of relevance Wit is used to compute the above-mentioned formulas (3) through (5) and determine the degree of certainty Ot for the cause t.

Meanwhile, the degree of relevance correction amount dWij– for the cause j other than t obtained as in the above-mentioned formula (12) is added to the degree of relevance Wij to correct the degree of relevance Wij, and this corrected degree of relevance Wij is used to compute the above-mentioned formulas (3) through (5) and determine the degree of certainty Oj for the cause j (steps 102 and 103).

The degree of certainty Oj (j=1, 2, . . . ) thus determined is then output to output device 113, such as displayed on the display screen of the PC (step 104).

As described above, with this embodiment, normal diagnosis knowledge that takes incidence into account is continuously re-learned by means of new data, so inference can always be performed accurately.

FIG. 5 shows the results of a simulation conducted by generating random data with an occurrence incidence of 0.5. The learning factor is g=0.05, and the initial values of five different degrees of relevance Wij were 0, 0.3, 0.5, 0.8, and 1.0.

As is clear from the figure, the final degree of relevance approaches 0.5 in every case regardless of the initial value, and it can be seen that the 0.5 occurrence incidence was learned with good integration.

Another embodiment of the inference apparatus pertaining to the present invention will now be described.

Figure 6:
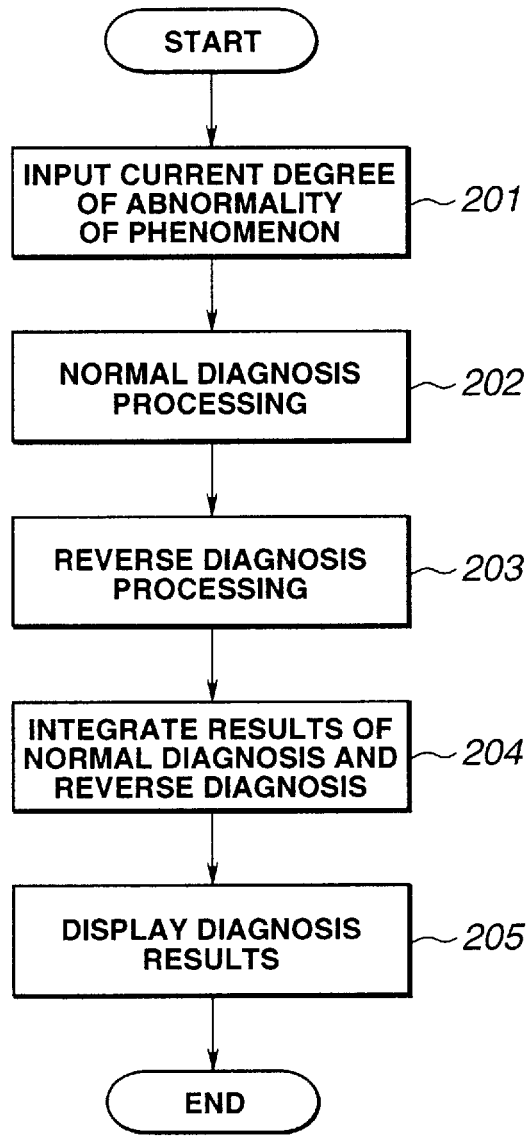
FIG. 6 is a flow chart of the treatment procedure in another embodiment of the inference apparatus pertaining to the present invention.

Again in this embodiment, just as in the above embodiment, a failure diagnosis apparatus for a construction machine is assumed. In specific terms, failure diagnosis is performed for a construction machine according to the procedure shown in FIG. 6 by a personal computer (hereinafter referred to as "PC").

FIGS. 7(a) and 7(b) show the structure of the normal diagnosis knowledge used to perform the normal diagnosis treatment, and the structure of the reverse diagnosis knowledge used to perform the reverse diagnosis treatment, both in the form of a matrix.

The types of phenomena are the same in both of these matrices (phenomenon 1, phenomenon 2, and phenomenon 3), and the types of causes are also the same (cause 1, cause 2, and cause 3). The phenomena, for example, are "black exhaust color" (phenomenon 1), "no power" (phenomenon 2), and "gradually worsening" (phenomenon 3), while the causes, for example, are "air cleaner clogging" (cause 1), "injection nozzle malfunction" (cause 2), and "battery malfunction"(cause 3) (see FIGS. 8 through 9).

The first step is for the operator to use the PC keyboard or the like to input data indicating the current occurrence rate of the above-mentioned phenomena 1, 2, and 3, that is, the degree of abnormality Ii (where i is a number corresponding to the above-mentioned phenomena 1, 2, and 3).

The degree of abnormality is within a range of $0 \leq Ii \leq 1$, and is given as a numerical value that is a subjective evaluation by the operator. In this case, a degree of abnormality of Ii=0 corresponds to an evaluation of "no abnormality whatsoever has occurred," while a degree of abnormality of Ii=1 corresponds to an evaluation of "a serious abnormality has occurred." When the abnormality is unknown (or not checked), a "–" that indicates data other than the above-mentioned numerical values is input. However, when "–" is given as the degree of abnormality Ii, it is treated as a degree of abnormality of Ii=0 for the purposes of the computation discussed below (step 101).

FIG. 10 illustrates a specific example of data indicating the degree of abnormality Ii. For the sake of simplicity of explanation, the numerical value range of the above-mentioned degree of abnormality is divided into a, b, and c (a>b>c). For instance, example No. 1 is a case in which the degree of abnormality is great (I1=a) for phenomenon 1 ("black exhaust coloring"), the degree of abnormality is medium (I2=b) for phenomenon 2 ("no power"), and the degree of abnormality is small (I3=c) for phenomenon 3 ("gradually worsening") (step 201).

A normal diagnosis treatment is then executed based on the degree of abnormality Ii input above.

Normal diagnosis knowledge that indicates the causal relation between the various phenomena and the various causes (the degree of effect, occurrence incidence, etc., between phenomena and causes) is required for this normal diagnosis treatment. The data for this normal diagnosis knowledge are stored in a specific memory ahead of time, unlike the degree of abnormality Ii. Since the above-mentioned normal diagnosis knowledge is data that indicate the degree of relevance between the various phenomena and the various causes, it will hereinafter be referred to as the degree of relevance Wij (j is a number corresponding to the above-mentioned causes 1, 2, and 3).

The degree of relevance Wij is given as a vague numerical value within the range of $0 \leq Wij \leq 1$, just as with the degree of abnormality Ii. In this case, a degree of relevance of Wij=0 corresponds to "no relevance whatsoever," while a degree of relevance of Wij=1 corresponds to "closely related." When the causal relation between the phenomenon i and the cause j is unknown, a "–" is used to express the fact that the value is outside the above-mentioned numerical value range of 0 to 1. However, when the degree of relevance Wij is "–," it is treated as a degree of relevance of Wij=0 for the purposes of the computation discussed below.

FIG. 8 illustrates a specific example of data indicating the degree of relevance Wij. For the sake of simplicity of explanation, the numerical value range of the above-mentioned degree of abnormality is divided into A, B, and C (A>B>C). For instance, example No. 1 is a case in which the degree of abnormality is great (W11=A) for phenomenon 1 ("black exhaust coloring") and cause 1 ("air cleaner clogging"), the degree of abnormality is small (W21=C) for phenomenon 2 ("no power") and cause 1 ("air cleaner clogging"), and the degree of abnormality is medium (W33 =B) for phenomenon 3 ("gradually worsening") and cause 3 ("battery malfunction").

The degree of certainty CFj obtained by the above normal diagnosis based on the degree of relevance Wij and degree of abnormality Ii is computed from the following formula (13).

$$CFj = \Sigma(Wij \cdot Ii) \qquad (13)$$

When the degree of certainty CFj obtained by the above computation is less than 0, the degree of certainty CFj is corrected to 0, and when the degree of certainty CFj is greater than 1, the degree of certainty CFj is corrected to 1, so that the degree of certainty CFj is always within the range of 0 to 1.

The degree of certainty CFj may also be computed from the following formula (14) or (15) instead of the above-mentioned formula (13).

$$CFj = max\{min(Wij, Ii)\} \qquad (14)$$

$$CFj = max(Wij \cdot Ii) \qquad (15)$$

FIG. 10 shows the degree of certainty CFj of the various causes j obtained as a percentage by normal diagnosis treatment. For instance, in the case of No. 1, the degree of certainty CF1 for cause 1 ("air cleaner clogging") is 88%, the degree of certainty CF2 for cause 2 ("injection nozzle malfunction") is 73%, and the degree of certainty for cause 3 ("battery malfunction") is 15% (step 202).

A reverse diagnosis treatment is then executed based on the degree of abnormality Ii input above.

Reverse diagnosis knowledge that indicates the causal relation between the various phenomena and the various causes is required for this reverse diagnosis treatment, just as with the normal diagnosis treatment. However, the causal relation in this case is different from that in normal diagnosis, instead being the occurrence extent or occurrence probability of a specific phenomenon i when a specific cause j is assumed to be the true cause. This reverse diagnosis knowledge is stored ahead of time in a specific memory, just as is the normal diagnosis information.

The reverse diagnosis knowledge is given as a vague numerical value within the range of $0 \leq W'ij \leq 1$, where W'ij is the degree of relevance between the phenomenon i and the cause j. In this case, a degree of relevance of W'ij=0 corresponds to "the phenomenon i does not occur at all when the cause j is assumed to be the true cause," while a degree of relevance of W'ij=1 corresponds to "the phenomenon i occurs markedly when the cause j is assumed to be the true cause." When the causal relation between the phenomenon i and the cause j is unknown, a "–" is used to express the fact that the value is outside the above-mentioned numerical value range of 0 to 1.

FIG. 9 illustrates a specific example of data indicating the degree of relevance W'ij. For the sake of simplicity of explanation, the numerical value range of 0 to 1 for the above-mentioned degree of relevance W'ij is divided into a, b, and c (a>b>c). For instance, the degree of relevance between cause 1 ("air cleaner clogging") and phenomenon 1 ("black exhaust coloring") is medium (W'11 =b), the degree of relevance between cause 1 ("air cleaner clogging") and phenomenon 2 ("no power") is small (W'21 =c), and the degree of relevance between cause 2 ("injection nozzle malfunction") and phenomenon 1 ("black exhaust coloring") is large (W'12=a).

The predicted degree of abnormality Pij is then determined by specific computation based on the above-mentioned degree of relevance W'ij. This predicted degree of abnormality Pij is the occurrence rate of the various phenomena i predicted from the causes j.

Next, the error Eij between the actual degree of abnormality Ii and the above-mentioned predicted degree of abnormality Pij is computed from the following formula (16).

$$Eij = Ii - Pij \qquad (16)$$

When the degree of abnormality Ii="–" or the predicted degree of abnormality Pij="–," the error is treated as Eij=0.

The ERRORj is then computed from the following formula (17) in order to indicate the magnitude of the above-mentioned error Eij for each of the various causes j.

$$ERRORj = \Sigma(Eij)*2/Nj \qquad (17)$$

Here, Nj is the number of phenomena i corresponding to the cause j that satisfies the conditions that Ii is not "–" and Wij is not "–."(X)*2 is defined as the square of X.

The degree of certainty CF'j obtained by reverse diagnosis based on the ERRORj obtained as above is computed from the following formula (18).

$$CF'j = 1 - ERRORj \qquad (18)$$

This formula (18) means that the smaller is the error Eij between the actual degree of abnormality Ii and the above-mentioned predicted degree of abnormality Pij, the greater is the degree of certainty.

FIG. 10 shows the degree of certainty CF'j of the various causes j obtained as a percentage by reverse diagnosis treatment. For instance, in the case of No. 1, the degree of certainty CF'1 for cause 1 ("air cleaner clogging") is 66%, the degree of certainty CF'2 for cause 2 ("injection nozzle malfunction") is 90%, and the degree of certainty for cause 3 ("battery malfunction") is 30% (step 203).

Normal and reverse integrated diagnosis is then performed, in which the normal diagnosis results obtained in step 202 are integrated with the reverse diagnosis results obtained in step 203. Specifically, the degree of certainty CF"j is determined from the following formula (19) based on the degree of certainty CFj obtained by normal diagnosis and on the degree of certainty CF'j obtained by reverse diagnosis.

$$CF"j = k1 \cdot CFj + k2 \cdot CF'j \qquad (19)$$

Here, k1 is the weighting factor for the degree of certainty CFj obtained by normal diagnosis, and k2 is the weighting factor for the degree of certainty CF'j obtained by reverse diagnosis. These weighting factors k1 and k2 are decided as desired according to the technological level of the design and the amount of experience with failure diagnosis of the drive machine in question.

The above-mentioned weighting factors k1 and k2 may also be varied over time. A specific example is given below.

|  | Normal diagnosis | Reverse diagnosis |
| --- | --- | --- |
| (Beginning of machine sale | 0.2 | 0.8) |
| (A long time after sale of machine | 0.6 | 0.4) |

FIG. 10 shows the final degree of certainty CF"j as a percentage. For instance, in the case of No. 1, the degree of certainty CF"1 for cause 1 ("air cleaner clogging") is 77%, the degree of certainty CF"2 for cause 2 ("injection nozzle malfunction") is 82%, and the degree of certainty for cause 3 ("battery malfunction") is 23%.

In particular, there tends to be no significant difference with the portions outlined in bold in FIG. 10 when normal diagnosis or reverse diagnosis is used alone, but a significant difference appears and the cause is apparent with normal and reverse integrated diagnosis (step 204).

The final degree of certainty CF"j is then displayed on the display screen of the PC (step 205).

As described above, this embodiment involves performing diagnosis by integrating normal diagnosis results with reverse diagnosis results, so the drawback encountered when normal diagnosis or reverse diagnosis was used alone is eliminated and more precise diagnosis is possible.

Specifically, the higher is the occurrence incidence of a cause, and the more similar the occurrence pattern of the phenomenon is to the cause, the greater is the degree of certainty of the diagnosis. Accordingly, even if the occurrence incidence is low, a cause whose occurrence pattern is similar to that of the phenomenon can be suspected, thus making up for the drawback to normal diagnosis. Also, even when the degree of similarity to the occurrence pattern of the phenomenon is the same, the lower is the occurrence incidence of the cause, the smaller is the degree of certainty, so a cause with a low occurrence incidence will not be suspected, thus making up for the drawback to reverse diagnosis.

Also, with this embodiment, since the normal diagnosis knowledge and the reverse diagnosis knowledge are expressed in the same format (the same failure phenomenon categories and the same failure cause categories), as shown in FIGS. 7(*a*) and 7(*b*), there is a labor savings in that format production is duplicated, so there is a reduction in the cost entailed by program production.

Furthermore, since the same format is used, another benefit is that there is also a labor savings because of duplicated input of data for the degree of abnormality Ii required in normal diagnosis and reverse diagnosis.

INDUSTRIAL APPLICABILITY

As described above, the present invention involves relearning normal diagnosis knowledge that takes incidence into account based on continuously updated data, so inference can be carried out more accurately, and the learning is also accomplished easily. Also, the drawbacks to a normal diagnosis treatment and a reverse diagnosis treatment can be compensated for and inference results can be obtained with fewer errors.

We claim:

1. An inference apparatus for inferring causes based on occurrence rate data indicative of a current rate of occurrence of various phenomena, and on degree of relevance data indicative of a degree of relevance between various phenomena and various causes, which comprises:

a storage device for storing normal diagnosis data including the degree of relevance data indicative of a degree of relevance between various phenomena and various causes, an input device for inputting the occurrence degree data indicative of a current rate of occurrence of the various phenomena, an inference device for receiving stored and input data and determining a certainty of each of the various causes by a calculation based of the occurrence degree data and the degree of relevance data and for inferring a cause by comparing the degree of certainty of each of the various causes, and an output device for outputting a result of the inference device, wherein the degree of relevance data is corrected such that each time a true cause is found, the degree of relevance between the true cause and the various phenomena becomes higher and the degree of relevance between causes other than the true cause and the various phenomena becomes lower.

2. An inference apparatus as defined in claim 1, wherein the occurrence rate data is given as a vague numerical value within a specific range, and an initial value of the degree of relevance data is being given in advance as a vague numerical value within a specific range.

3. An inference apparatus as defined in claim 2, wherein the occurrence rate data is set to a numerical value corresponding to "no occurrence whatsoever" when the occurrence rate of a phenomenon is "unknown," and the initial value of the degree of relevance data is set to a numerical value corresponding to "no relevance whatsoever" when the degree of relevance between a phenomenon and the cause is "unknown."

4. An inference apparatus as defined in claim 1, wherein the inference of the cause is performed by determination of an occurrence probability of the various causes by a specific computation based on the occurrence rate data and the degree of relevance data.

5. An inference apparatus as defined in claim 4, wherein the correction of the degree of relevance data related to the true cause is performed by determining a degree of relevance correction amount by a specific computation based on the current occurrence probability of the true cause, adding the degree of relevance correction amount to the current degree of relevance data, and increasing the value of these data.

6. An inference apparatus as defined in claim 5, wherein the correction of the degree of relevance data not related to the true cause is performed by determining a degree of relevance correction amount corresponding to the above-mentioned degree of relevance correction amount by a specific computation, subtracting this degree of relevance correction amount from the current degree of relevance data, and decreasing the value of these data.

7. An inference apparatus for inferring causes based on occurrence rate data that indicate a current rate of occurrence of various phenomena, on predicted occurrence rate data that indicate a rate of occurrence of various phenomena predicted from the causes, and on degree of relevance data that indicate a degree of relevance between the various phenomena and the various causes, characterized by comprising:

first inference means for inferring a degree of certainty for each cause based on the occurrence rate data and the degree of relevance data;

second inference means for comparing the predicted occurrence rate data and the occurrence rate data for each cause and inferring the degree of certainty for each cause such that the smaller is an error in the causes, the greater is the degree of certainty; and means for giving specific weighting to each degree of certainty inferred by the first and second inference means and finally inferring the degree of certainty for each cause based on the weighted degrees of certainty.

* * * * *